Oct. 20, 1959     N. KARPF     2,909,110
PHOTOGRAPHIC CAMERA

Filed April 11, 1952     3 Sheets-Sheet 1

INVENTOR
NIKOLAUS KARPF

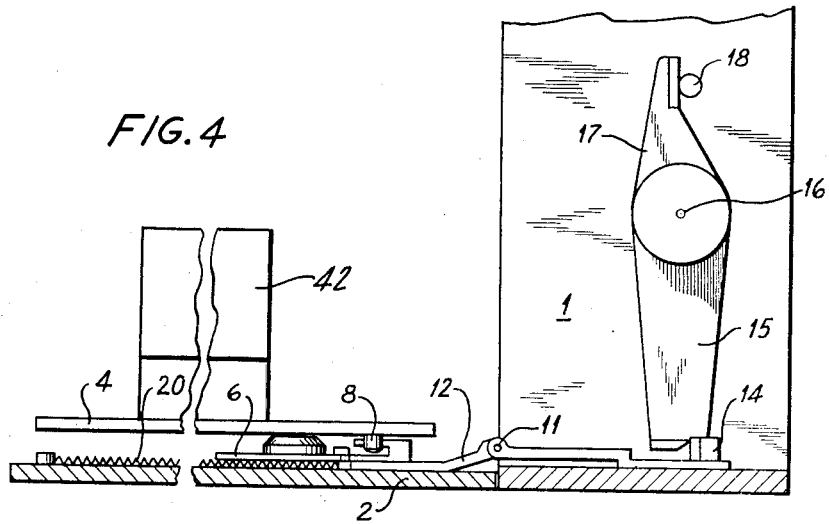
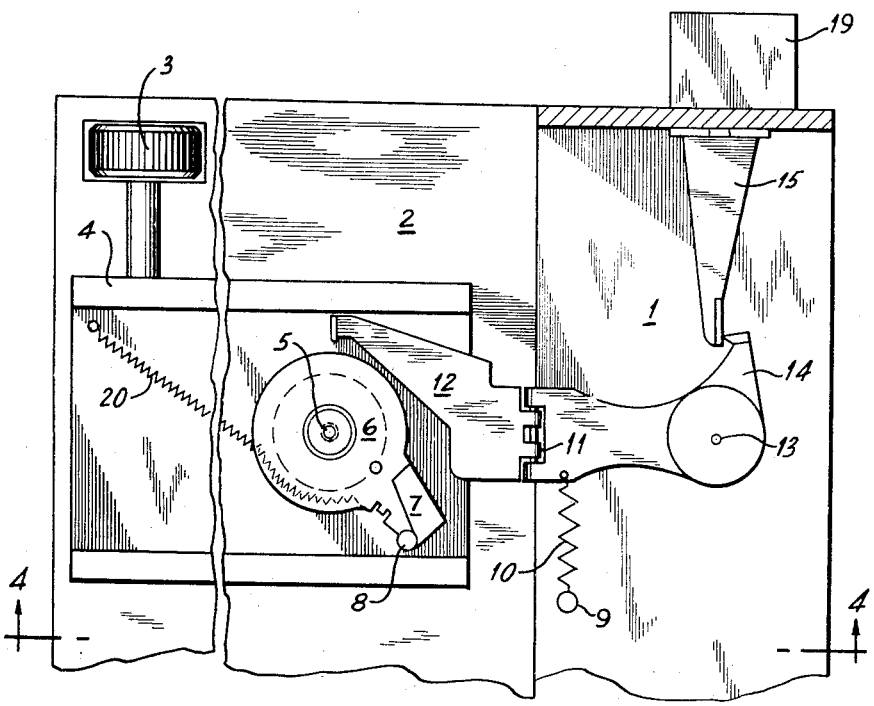

Oct. 20, 1959 N. KARPF 2,909,110
PHOTOGRAPHIC CAMERA
Filed April 11, 1952 3 Sheets-Sheet 3

INVENTOR.
NIKOLAUS KARPF
BY

United States Patent Office 2,909,110
Patented Oct. 20, 1959

2,909,110

PHOTOGRAPHIC CAMERA

Nikolaüs Karpf, Munich, Germany, assignor to Valentin Linhof, Munich, Germany, a company of Germany Application April 11, 1952, Serial No. 281,818

Claims priority, application Germany April 12, 1951

3 Claims. (Cl. 95—44)

This invention relates to focus adjusting means for cameras.

Photographic cameras are known, where the necessary movements required for bringing the camera into focus, are reduced to a minimum in such a manner that the lens and the movable joint of the rangefinder are coupled with each other by means of movement transmitting means. In addition, a movable member extending to the rangefinder can be coupled thereto and to an indicator provided with a scale to reciprocally actuate the rangefinder.

This invention refers to a simplified, cinematic solution whereby lenses of different focal length, i.e. normal lenses, wide-angle lenses and telephoto lenses are brought into focus according to the requirements of the operator.

It is one of the objects of the present invention to provide means affording adjustment of the position of focus and the coordination thereof relative to the range finder of the camera, whereby the focal length adjustment means is accommodated on the swingable bed of the camera.

It is a further object of the present invention to provide means for controlling transmission means interconnecting said focus adjusting means with the means for actuating the range finder, said transmission means extending from the swingable drop bed of the camera into the camera housing and being collapsible in the latter.

Still a further object of the present invention is to provide means facilitating change of the range finder field relative to the respective lens focus position and to accommodate interconnecting means therefor in a space-saving manner to extend from the drop bed of the camera to one of the side walls within the camera housing, whereby the aforesaid adjustment means are made readily accessible on the surface of the drop bed of the camera.

These and other objects and features will become apparent from the following detailed description, reference being had to the accompanying drawing, in which.

Figure 2:
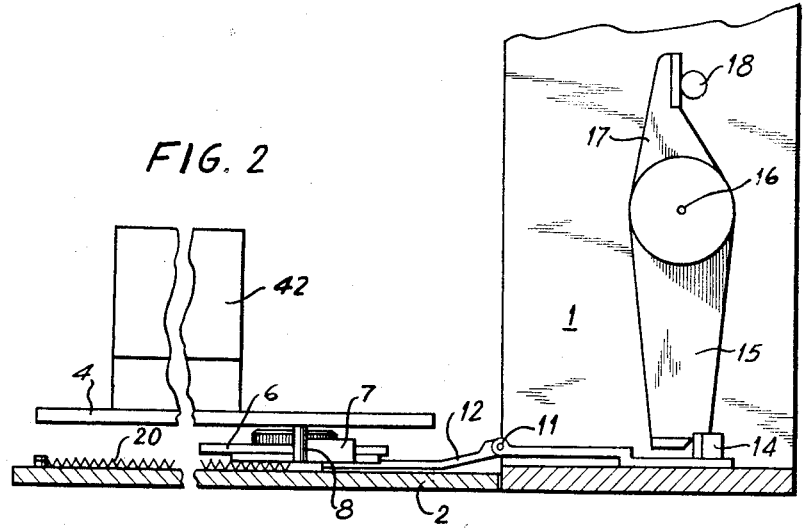
Fig. 2 is a vertical sectional view through the camera and drop bed thereof when swung away from the camera housing, as taken along line 2—2 in Fig. 1.
Figure 1:
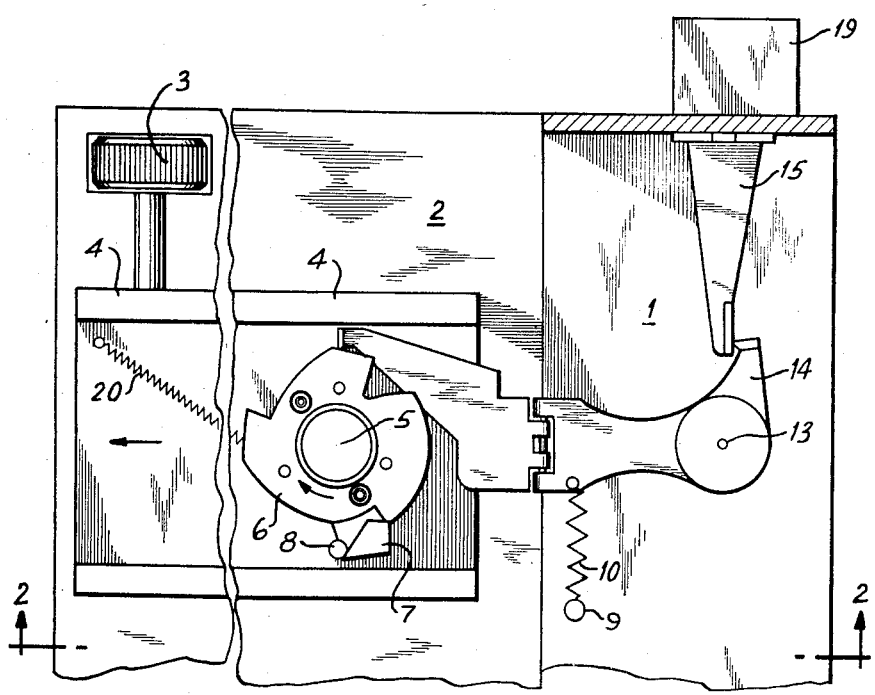
Fig. 1 is a top plan view of the bed of the camera with the housing thereof partly in section.
Figure 6:
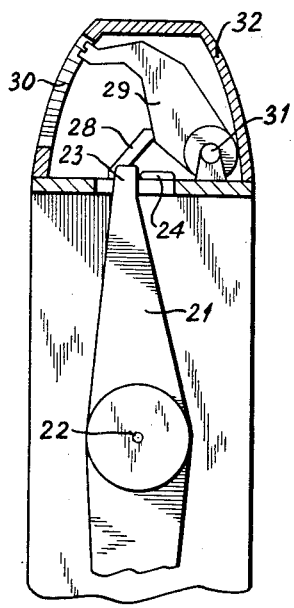
Figure 7:
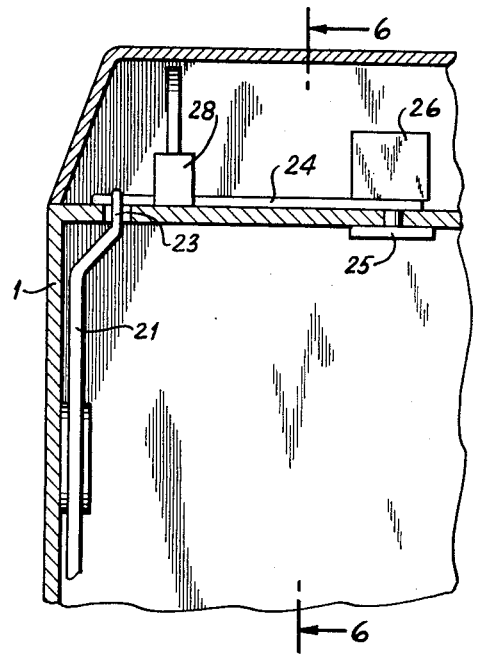
Figure 8:
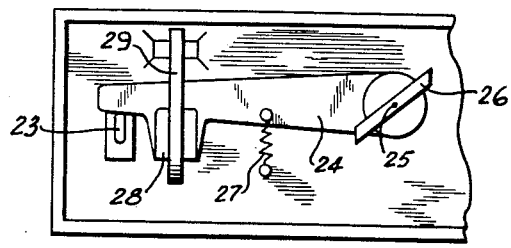
Figure 5:
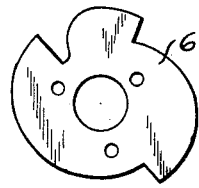

Figs. 3 and 4 are views similar to Figs. 1 and 2 with certain parts omitted in order to expose other parts lying beneath said omitted parts and to which reference is made in the specification, with Fig. 4 being a sectional view taken along line 4—4 in Fig. 3;

Fig. 5 shows in detail an adjustment element employed in the invention;

Fig. 6 is a sectional view taken along the lines 6—6 of Fig. 7;

Fig. 7 is an elevational view partly in section of a modified embodiment of the invention and showing the interconnection between the range finder and the focus adjustment means; and Fig. 8 is a top plan view of Fig. 7, with the top cover of the latter removed.

The drop-bed 2 shown as swung away from the camera housing 1 is equipped at the front end with a knurled knob 3 which engages a drive for extending the tracks 4 located on the drop-bed to required position. Thus the objective carrier 42 with lens (shown schematically in the drawing) which is carried by the tracks 4 is moved into the position required for taking the picture. A guide system consisting of the two guide plates 6 and 7 is located on the axle 5 which in turn is mounted on the drop-bed. The stop-pin 8 connected to the tracks transmits the movements to guide plate 7 respectively to its extension position according to the respective position of the tracks 4 with respect to the drop-bed 2. The rotation of plate 7 thus caused is transmitted to plate 6 comprising at least two or more guide portions, one of which corresponds to the respective focal length. The plate 6 is located on the axle 5 and fixed thereon in accordance with the lens required for the picture and moves along with the guide plate 7 located beneath.

The extension arm of the lever 12 equipped with a hinge 11 is rotatable around suspension pivot 13 and engages with its free end the respective guide portion of plate 6 required for the transmission of the movement while being under the influence of a spring mounted in the camera housing at 9. This movement is transferred through the arm 14 to the angular lever 15 which is movable around pivot axis 16, arm 17 of said lever engaging with an element or bolt 18. This bolt is fixed to the movable mirror (not shown) of the rangefinder 19.

Figs. 3 and 4 illustrate the drive as described before, however, plate 6 is omitted. In general all previously described drive elements are however illustrated. Due to the removal of plate 6 the spring 20 which causes a constant engagement of the extension arm of plate 7 with the stop-pin 8 mounted on the tracks 4, becomes apparent and visible.

According to Figs. 6 to 8, the rangefinder is attached to another side of the camera housing 1 than indicated in Figs. 1 to 4. The transmission of movement of the swing lever 12 is caused through the transmitting lever 21 which is movable around the pivot 22. The free end of the lever 21 is provided with a cam 23. This cam actuates an arm 24 attached on one side of the camera housing and movable around a pivotal axis with which the movable mirror 26 of the rangefinder is operatively connected. The arm 24 is subject to the influence of the spring 27 through which the shifting of the indicator arm 29 towards the scale 30 is transmitted. The indicator arm is therefore revolvable around the pivotal axis 31 and by means of a torsion spring (not shown) is constantly forced into its basic or zero position.

The rangefinder and the indicator system are protected by housing 32 which is located on another side of the camera housing 1. The housing 32 is provided with a window which is located above the scale 30.

It can thus be seen that there has been provided in accordance with the present invention a drop bed 2 for a camera having adjustment means 3, 4, 8 operatively connected to guide means 6 provided with cam faces corresponding to the respective focal lengths, whereby the latter faces coact with one end of the lever system 12—15 to change the position of the movable mirror 26 of the range finder.

Having thus described the invention, what is claimed as new and desired to be secured by Letters Patent, is:

1. A photographic camera comprising a housing defined by walls and having a drop bed, a first hinge connecting said drop bed to said housing, an objective carrier adapted to receive a plurality of lenses each of predetermined different focal lengths, a track located on said drop bed, said carrier being supported on said track, means for displacing said track and said carrier along said drop bed to assume various positions of focus, a rangefinder mounted on said housing and including a movable mirror and an element fixed to said mirror, movement transmitting means for translating the respective position of said objective carrier via said element to said mirror of said rangefinder, a rangefinder indicator and a scale therefor provided in the upper part of said housing and operatively connected to said rangefinder mirror, said movement transmitting means including a swingable lever pivoted on one wall of said housing and having one free end and equipped with a second hinge, the axis of said second hinge being positioned above and in vertical alignment with the axis of said first hinge, an angular lever provided with a plurality of free ends and pivotable about an axis disposed on another of said walls of said housing, one of said free ends of said angular lever engaging said element, whereas another free end contacts said swingable lever, a first upper rotary cam disc provided with differently shaped guide curves, each of said guide curves being shaped in accordance with a respective lens of predetermined focal length, said swingable lever being spring-biased for forcing said free end of said swingable lever in contact with a selected guide curve, a second lower rotary disc operatively connected to said first upper rotary disc and mounted for rotation about the same axis of said first rotary disc, said second rotary disc having a spring-biased extension arm abutting against a stop-pin provided on said displaceable track, the shape of each of said guide curves of said first rotary cam disc being such that the rangefinder is automatically adjusted via said angular lever and said swingable lever to provide proper range for the particular lens for which the respective guide curve is designed when said camera lens is adjusted to proper focusing position, the latter being perceivable by said indicator on said scale.

2. A photographic camera according to claim 1, said means for displacing said track and said carrier including drive means connected to said track, and a knurled knob on said drop bed connected to said drive means for operating the latter.

3. A photographic camera comprising a housing defined by walls and having a drop bed, a first hinge connecting said drop bed to said housing, an objective carrier adapted to receive a plurality of lenses each having a predetermined different focal length, a track located on said drop bed, said carrier being supported on said track, means for displacing said track and said carrier along said drop bed to assume various positions of focus, a movable mirror mounted on said housing, movement transmitting means for translating the respective position of said objective carrier to said movable mirror, an indicator and a scale therefor provided in the upper part of said housing and operatively connected to said movable mirror, said movement transmitting means including a swingable lever including a second hinge and pivoted on one wall of said housing and terminating in one free end, the axis of said second hinge being positioned above and in vertical alignment with the axis of said first hinge, an angular lever provided with opposite free ends and pivotally mounted on another of said walls of said housing, one of said free ends of said angular lever being operatively connected to said mirror and indicator, whereas another free end of said angular lever contacts said swingable lever, a first upper rotary cam disc provided with differently shaped guide curves, each of said guide curves being shaped in accordance with a respective lens of predetermined focal length, means for forcing said one free end of said swingable lever in contact with a selected guide curve, a second lower rotary disc operatively connected to said first upper rotary disc and mounted for rotation about the same axis of said first rotary disc, said second rotary disc having a spring-biased extension arm, a stop-pin provided on said displaceable track, said arm abutting against said stop-pin to control the position of the selected guide curve with respect to said one free end of said swingable lever, the shape of each of said guide curves of said first rotary cam disc being such that the mirror and indicator are automatically adjusted in position via said angular lever and said swingable lever in accordance with the respective lens for which the selected guide curve is designed when said lens is adjusted to proper focusing position, which is perceivable by said indicator on said scale.

References Cited in the file of this patent
UNITED STATES PATENTS

| | | |
|---|---|---|
| 1,177,622 | Helton | Apr. 4, 1916 |
| 1,252,762 | Young | Jan. 8, 1918 |
| 2,167,435 | Hineline | July 25, 1939 |
| 2,293,438 | Liebmann et al. | Aug. 18, 1942 |
| 2,346,076 | Mihalyi | Apr. 4, 1944 |
| 2,391,152 | Gillon | Dec. 18, 1945 |
| 2,395,074 | Schwartz et al. | Feb. 19, 1946 |
| 2,481,677 | McAdam et al. | Sept. 13, 1949 |

FOREIGN PATENTS

| | | |
|---|---|---|
| 543,554 | France | June 7, 1922 |
| 398,045 | Germany | July 10, 1924 |
| 642,352 | Germany | Mar. 2, 1937 |
| 804,063 | Germany | Apr. 16, 1951 |